Nov. 14, 1939.　　　　C. J. BOCK　　　　2,179,708

TRAILER

Filed March 10, 1937　　　　4 Sheets-Sheet 1

Inventor
Carl J. Bock

By Blackmore, Seuser & Flint
Attorneys

Nov. 14, 1939.  C. J. BOCK  2,179,708
TRAILER
Filed March 10, 1937  4 Sheets-Sheet 2

Nov. 14, 1939.   C. J. BOCK   2,179,708
TRAILER
Filed March 10, 1937   4 Sheets-Sheet 4

Inventor
Carl J. Bock
By Blackmore, Spencer & Flint
Attorney

Patented Nov. 14, 1939

2,179,708

UNITED STATES PATENT OFFICE 2,179,708

TRAILER

Carl J. Bock, Pontiac, Mich., assignor to Yellow Truck & Coach Manufacturing Company, Pontiac, Mich., a corporation of Maine Application March 10, 1937, Serial No. 130,002

13 Claims. (Cl. 280—33.1)

This invention relates to motor vehicles and more particularly to an improvement in the coupling mechanism of a tractor-trailer combination.

Vehicles of this character comprise separable tractor and semi-trailer units with the rear end of the trailer supported on road wheels and the front end supported through a detachable swivel connection on the rear of the tractor or when detached through retractible landing gear. To reduce manual effort and avoid human error through inattention or oversight, the operation of the landing gear may be made dependent upon relative movement of the tractor and trailer in the coupling and uncoupling operations which insures proper support of the trailer standing alone. Parking brakes on the rear wheels hold the trailer stationary during relative tractor movement and mechanism is provided to compel setting of the brakes before the start of and as an incident to conditioning the parts for the uncoupling operation and to release the brakes automatically and also lock the parts in coupled relation as the coupling operation reaches completion.

It is an object of the present invention to provide improved structure acceptable to operators of road hauling equipment which may be manufactured commercially and supplied at reasonable cost to the trade and which in use will be positive in action, unlikely to get out of order and interchangeable with other equipment already in use.

A further object is to provide a semi-trailer with coupling members movable with the tractor king pin during coupling and uncoupling operations and operatively connected with the landing gear for raising and lowering landing gear automatically, the motion transmitting connections between the landing gear and couplers being so constructed and arranged that in proportion to the range and rate of travel of the couplers, the movement of the landing gear is through a greater range and is accelerated in the intermediate portion of its range but is relatively slow near opposite limits, and being arranged also to hold the landing gear against accidental displacement from either lowered or raised positions. Deceleration and increased power in the final portion of the range of travel is incident to the action of the leverage connections, designed to cushion inertia shock and eliminate sudden change in momentum.

Another object is to provide a pair of swinging couplers which cooperate to afford a king pin receiving opening at their forward limit of movement but close around and completely embrace the king pin and have a straight line motion therewith in both directions of its travel in the king pin guide slot of the fifth wheel bearing plate.

A further object is to provide a releasable locking member for holding the couplers at their rearward limit and transmitting tractor pulling force together with operating mechanism adapted to be actuated manually to release the locking member and at the same time apply the parking brakes, there being associated therewith overcenter linkage to hold the parts in the manually set position until tripped for the automatic restoration of the parts at the end of a subsequent coupling operation.

Other objects and advantages of the structure will become apparent during the course of the following specification, having reference to the accompanying drawings wherein.

Figure 4:
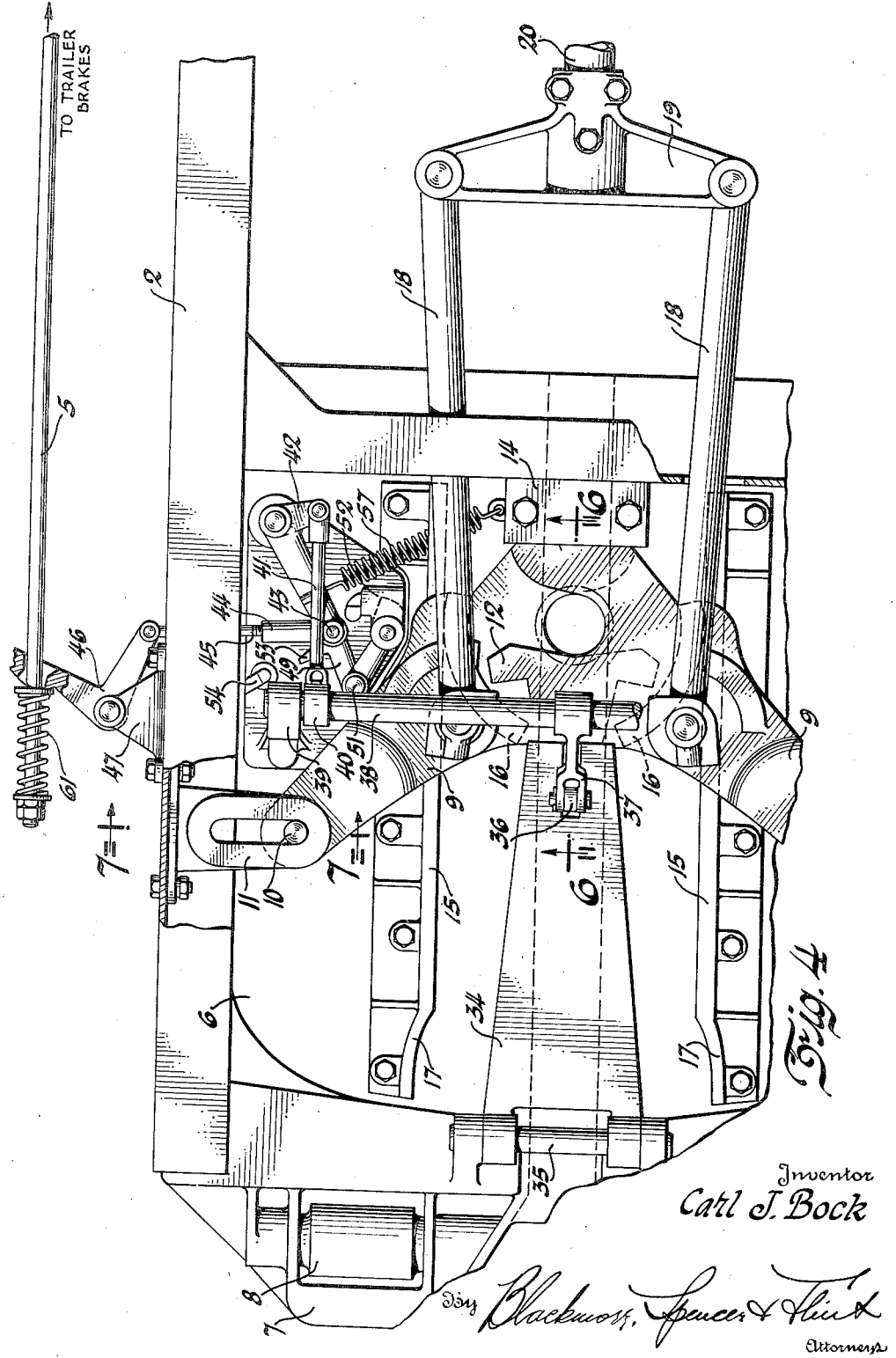
Figure 4 is a view similar to Figure 3 but showing the parts on a larger scale and in coupled relation.
Figure 6:
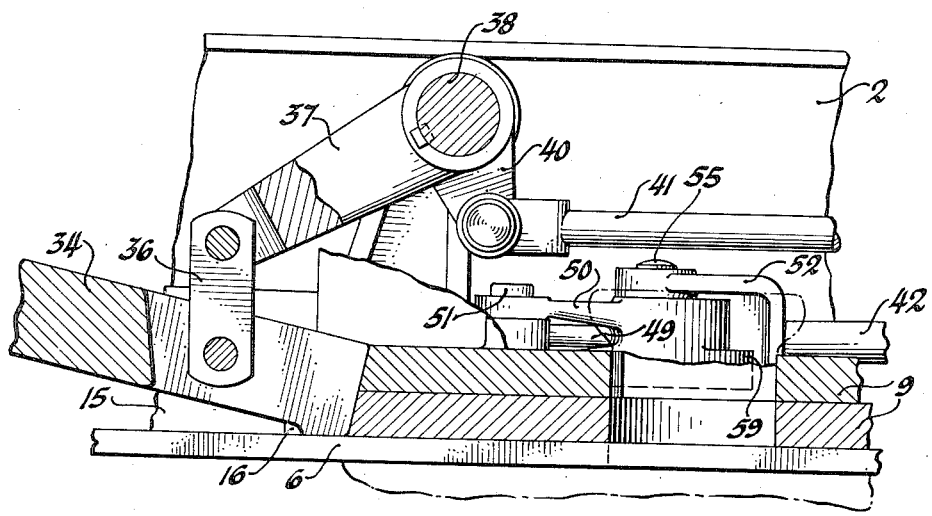
Figure 7:
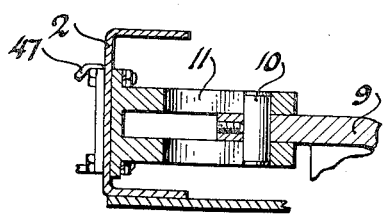

Figures 6 and 7 are detail sections taken on lines 6—6 and 7—7 respectively in Figure 4.

Figure 8:
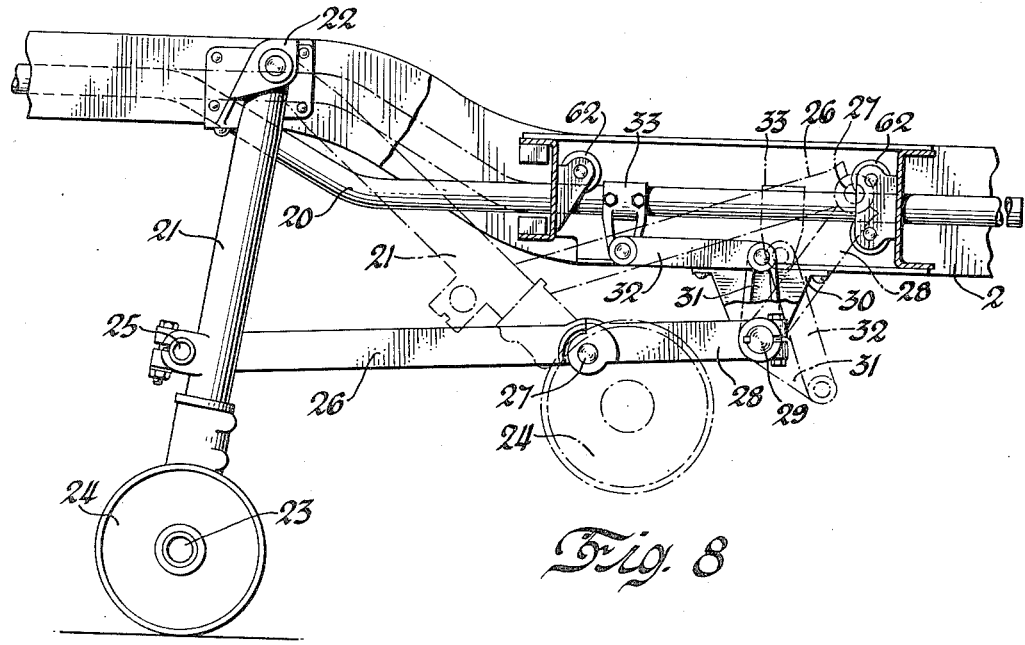

Figure 8 is a side elevation of the retractible landing gear, and

Figure 9:
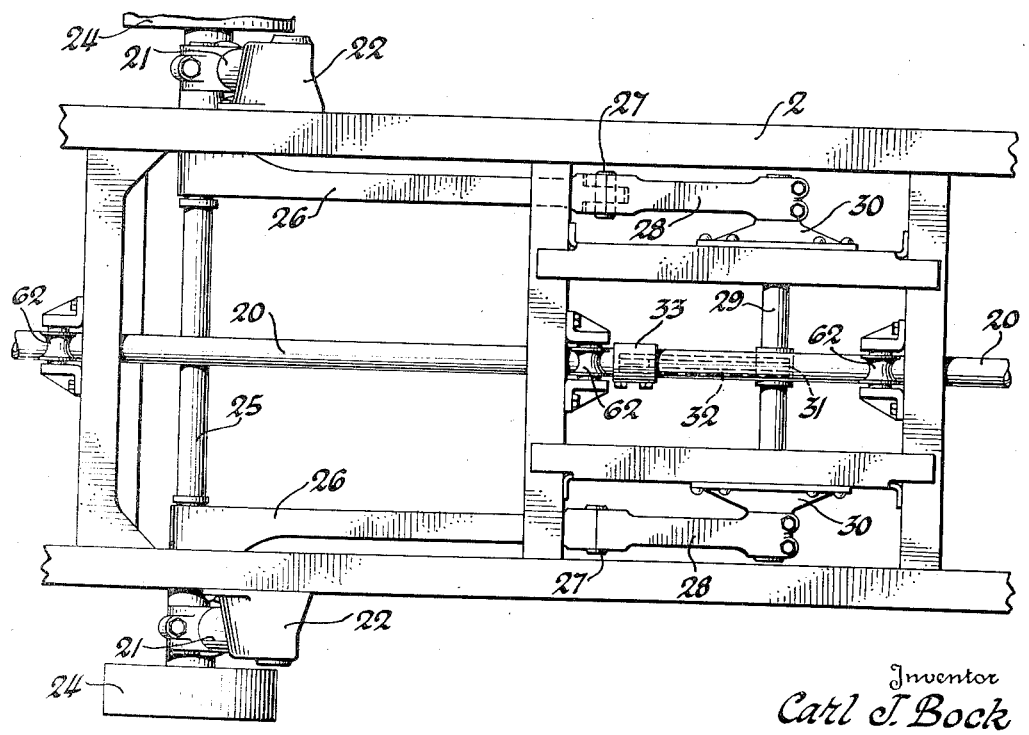

Figure 9 is a top plan view of the landing gear mechanism.

Referring to the drawings, number 1 indicates a tractor or motive power unit supported upon four wheels and having the usual tilting fifth wheel and king pin which supports the front end of a trailer frame 2, the rear end of which is mounted upon a pair of wheels 3. These wheels incorporate suitable braking mechanism which may be controlled from the driving cab of the tractor 1 and additionally for parking purposes the brakes may be provided with an operating lever 4 from which extends forwardly a link 5 to be operated as later described. The upper fifth wheel carried by the trailer frame 2 consists of a pair of spaced plates 6 affording therebetween a longitudinally extending king pin guide slot. To provide a flaring entrance mouth to the king pin slot a pair of castings 7 having divergently related adjacent faces are mounted on the nose of the trailer frame 2 and these castings constitute skids preferably having rollers 8 to ride on the lower fifth wheel during coupling and uncoupling operations.

Mounted above the trailer fifth wheel are a pair of swinging couplers 9 having outer ends or tail pieces pivotally connected by pin and slot connections with the trailer frame 2. The pin and slot connection may, for convenience, be afforded by a pin 10 carried by the coupling member and a transversely slotted frame bracket 11 which allows a transverse shifting of the pin for a purpose to be described. The other end of each coupler 9 is in the nature of a fork to receive the king pin for movement with the king pin, both fore and aft. The opening in at least one fork is of a width substantially corresponding with the diameter of a narrow neck or annular groove in the king pin so that the coupler not only embraces the king pin radially but also keys the parts against vertical displacement. The foremost tine of each coupler fork is formed with a lug 12 which is adapted to engage an abutment 13 to limit forward movement of the coupler jaw and position the forked opening in alignment with the entrance mouth for the reception of the king pin. The remote face of the other tine of the fork is shaped to seat on the forward face of an abutment block 14 carried on top of the fifth wheel and establishing a limit for the rearward movement of the couplers. Driving thrust is also imparted through this block 14 when the tractor-trailer combination is backed up. At this point, mention is made of the fact that the king pin slot in the fifth wheel extends rearwardly beyond the coupled position of the king pin and therefore prevents the formation of a pocket which would collect dirt and eventually interfere with proper operation inasmuch as the continuous opening allows any accumulation of foreign matter to be pushed and dropped through the opening.

Figure 1:
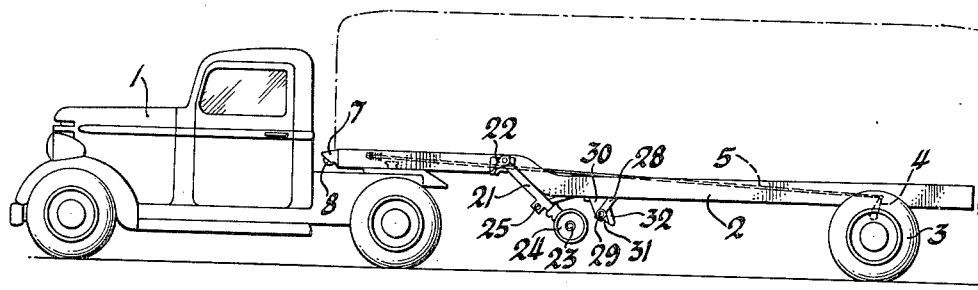
Figure 1 is a side elevation of a tractor and semi-trailer in coupled relation.
Figure 2:
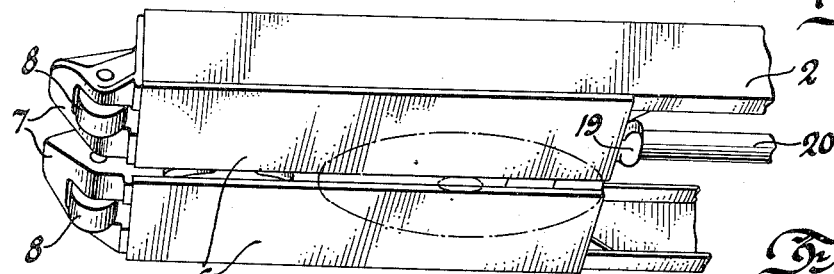
Figure 2 shows in perspective the trailer fifth wheel looking from the underside.
Figure 3:
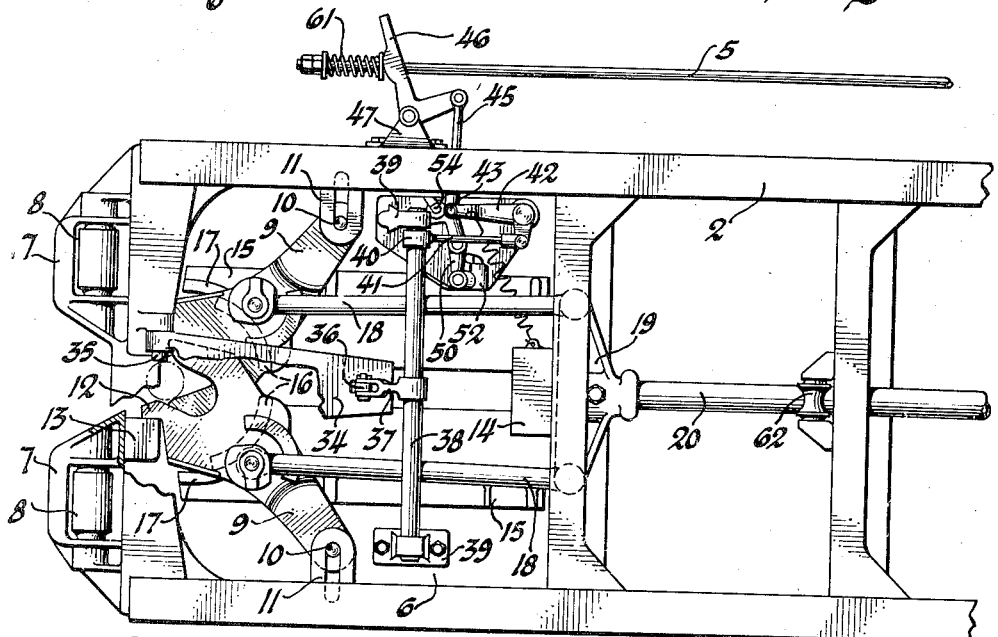
Figure 3 is a top plan view of the trailer fifth wheel and coupling mechanism showing the uncoupled relation of the parts.

Also carried on the top of the fifth wheel and on opposite sides of the king pin slot are a pair of spaced guides 15 of angle section, the vertical faces of which are slidably engaged by arcuate bearing shoes 16 on the couplers 9 and by reason of which the swinging levers are given a substantially straight line motion throughout their travel with the king pin except immediately adjacent the forward limit of movement. This straight line motion is accommodated by the transverse movement of the pins 10 in the elongated bearing slots of the frame brackets 11. By reason of this straight line movement, the forked openings are at all times in vertical alignment with the king pin slot of the fifth wheel and together the forks cooperate and completely encircle the king pin except when the parts are in the uncoupled position shown in Figure 3 where both openings permit the egress and entrance of the king pin. To enable the forks to be spread apart at the forward limit of movement, the guide members 15 terminate in arcuate depressions 17 into which the bearing shoes 16 move laterally.

The movement of the coupler jaws 9 in unison with the king pin is utilized for actuating the landing gear. Rearward movement of the couplers serves to raise the supporting props and forward movement to lower the props. Accordingly, each jaw coupler is joined by a rod 18 to a head 19 on the forward end of a slidable reach bar 20 which is mounted in spaced rollers 62 carried by the frame and extends longitudinally of the frame for connection with suitable linkage to a swinging support. The rollers 62 were selected for mounting the slidable reach 20 in order to minimize frictional drag and resistance to reach rod operation. Because of the roller mounting; wear of bearing surface and the likelihood of binding due to dirt accumulation is reduced and there is no need for frequent cleaning and greasing of the parts and other attention in use.

The support consists of a pair of transversely spaced legs 21 pivotally mounted at their upper ends in frame brackets 22 and joined at their lower ends by an axle 23 for a pair of ground engaging wheels 24, which enable the disconnected trailer to be moved independently of the tractor should occasion arise. Intermediate their length, the legs 21 carry a transverse shaft 25 to which and beside each leg, is pivoted one end of a connecting rod or link 26, the other end of which is joined by knuckle joint 27 to a swinging lever 28 keyed on the end of a rockshaft 29. The rockshaft is mounted in frame brackets 30 and extends transversely of the trailer frame and immediately below the reach rod 20 carries a lever 31 to which one end of a link 32 is pivoted, the other end being pivoted to a coupling sleeve 33 on the reach rod 20. The links 26 and 28 when in extended position as seen in Figure 8 preclude accidental collapse and oppose displacement of the supporting frame from the adjusted position. As an additional safeguard against displacement the parts are designed that the point of ground engagement is forward of the swinging axis in the bracket 22 for the supporting frame wherefore the load tends to place the links 26 and 28 in tension.

In the coupling operation the transmission of tractor movement through the reach rod moves the reach toward the right in Figure 8 to rock the shaft 29 in a clockwise direction which immediately breaks or kicks over the knuckle joint 27 for collapse of the parts and the elevation of the props to the dotted line position shown. In this dotted line position, the gravity weight of the elevated props is distributed between the frame bracket 22 and the rockshaft 29 through the knuckled linkage with the lever 28 extending in a direction almost parallel to the direction of down thrust to assist in relieving the parts from strain. It will be noted too, that the link 32 extends in a direction almost normal to the direction of movement of the reach 20 so as effectively to resist counterclockwise rotation tendency of the shaft 29.

Movement of the reach 20 toward the left in Figure 8 during the uncoupling stroke is transmitted through the link 32 for rocking the shaft 29 in a counterclockwise direction to again bring the links 26 and 28 into extended straight line relation. In this connection it should be noted that the combined action of the levers is such that prop movement between opposite limits is initially slow, becomes accelerated and finally slows down smoothly to completion. Considering the action of the folding links 26 and 28 in the initial lowering movement the arc described by the knuckle joint 27 is angularly related to the direction of arcuate travel of the legs 21, then swings into a general direction substantially coinciding or parallel to the direction of leg movement and finally changes to a direction substantially normal to the arc of leg movement. The concurrent movement of the lever 31 is initially in a direction normal to that of the reach and works into a path substantially parallel to that of the reach. Consequently in the final movement the mechanical advantage increases the force imparted to the ground engaging frame for overcoming obstructions or uneven road surface not only to avoid breakage of the parts but to insure the supporting legs coming into action. Because the rate of travel of the retractible support assembly to either raised or lowered position decelerates smoothly to a stop, sudden shock is avoided regardless of the speed and force with which coupling and uncoupling operations are performed.

Primarily the props are held in raised position by locking the king pin couplers against movement from their rearward limit. In the present case, this is accomplished by a blocking member 34 obstructing the path of the couplers and engaged at one end against inclined faces specially provided on each coupler and pivotally mounted at the forward end on the frame carried pin 35 which enables the blocking member 34 to be swung upwardly to release the couplers.

Mechanism for the manual release of the member 34 includes a link connection 36 with a rock lever 37 keyed on the transverse shaft 38. The opposite ends of the shaft 38 are mounted in suitable brackets 39 on the top of the fifth wheel 6 and at one side the shaft carries a lever 40 joined by a link 41 to one leg of a bell crank 42 pivotally mounted on the trailer frame. The other leg of the bell crank 42 is joined by a pivoted pin 43 to a coupling nut or sleeve 44 in which is adjustably threaded a rod 45 extending through an opening in the trailer frame side member for pivotal connection with a manually actuated bell crank 46 pivoted in the frame bracket 47. The outer leg of the crank 46 is apertured for the extension therethrough of the front end of the brake rod 5 which carries a coil spring 61 seated at one end against a pair of adjustable nuts on the rod and at the other end on the bell crank. This coil spring 61 serves as an elastic motion transmitting member which compensates for brake lining wear and also eliminates the need for extreme accuracy in connecting the parts. For manually operating the bell crank 46 there may be employed a separable handle portion or alternately a handle portion may be separately pivoted to the frame bracket 47 and engageable with the rear face of the outer leg of the bell crank to swing the same for applying the brakes through the rod 5 and moving the blocking member 34 to inoperative position.

Figure 5:
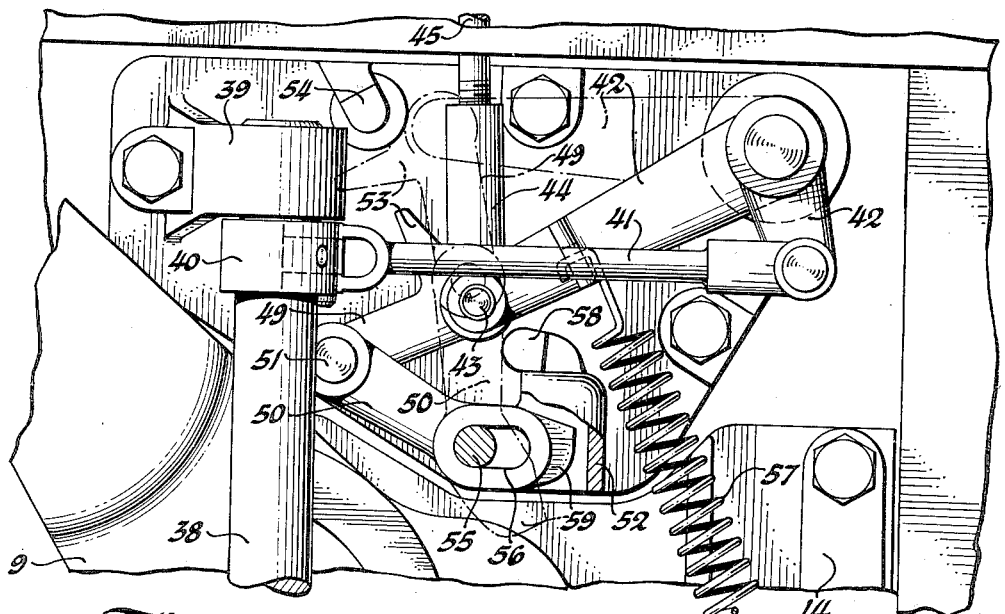
Figure 5 is a fragmentary plan view of the coupler release and brake setting linkage.

To hold the parts in the position to which they have been moved manually there has been incorporated an automatically releasable overcenter linkage arrangement (see Figure 5) including the pair of links 49 and 50 interpivoted at 51 at their adjacent ends with the remote end of the link 50 pivoted in a fixed bracket 52 and the remote end of the other link pivoted to the pin 43 at the end of the rod coupling 44. These links will be extended or straightened into substantial alignment with each other when the bell crank lever 42 is rocked outwardly and as the links reach extended relation an arm 53 at the outer end of the link 49 engages an abutment or fulcrum stop 54 whereupon further outward movement causes the links to buckle and swings the connection 51 beyond the center line of the pivotal connections at opposite ends of the links. Swinging to overcenter relation necessitates a pin and slot connection between the link 50 and the bracket 52. This pin and slot connection may include a pin 55 carried by the fixed bracket 52 and an elongated slotted eye 56 on the link. With the link 50 swung to the transverse position the slot in the eye 56 also extends transversely and in the direction of pull to allow the links to be shifted bodily with reference to the pin 55. As soon as manual pull is relieved the coil spring 57 fastened at opposite ends to the bell crank 42 and the abutment block 14 or other fixed anchorage, comes into action to hold the links in the overcenter relation in which the innermost link 50 abuts a stop lug 58 formed conveniently on the bracket 52.

For tripping the overcenter linkage and allowing parts to be restored, the end of the link 50 terminates in a coupler engaging abutment 59 adapted for projection into the path of an adjacent portion of one of the coupler members 9. When the links are first moved to the overcenter relation referred to above the coupler is in its rearmost position and the abutment 59 rides on the adjacent portion of the coupler, the whole of the linkage being shifted outwardly by reason of the pin and slot connection 55—56 and being so held until the coupler is moved forwardly with the king pin and out of the way of the abutment, whereupon under influence of the spring 57 the linkage is shifted bodily inwardly and the parts assume the dotted line position shown in Figure 5. In this position, it will be seen that the abutment 59 is brought into the path of the coupler and during a subsequent coupling operation, as the coupler arm reaches the rearward limit of its movement, it strikes and swings the abutment 59 about the pin 55 and causes the links 49 and 50 to straighten out in reverse order and then to collapse again under influence of the spring 57.

With the tripping of the snap over mechanism, the parts return to original position automatically with the completion of the coupling stroke, the brakes being released and the member 34 again moving into blocking relation with the coupler jaws as seen in Figure 6.

From the above description it will be apparent that to uncouple and leave the trailer standing alone, it is only necessary to swing the bell crank 46 manually and then drive away the tractor and that the coupling operation is effected by simply backing the tractor under the trailer, no other manipulations or adjustments being required.

I claim:

1. In a tractor-trailer organization, a retractible support, a rockshaft having a pair of radially projecting arms, a motion transmitting link pivoted at opposite ends to one of said arms and said support respectively and adapted to extend in alignment with the arm with the support lowered, a longitudinally movable member to actuate the rockshaft, and a motion transmitting link pivoted at opposite ends to said member and the other arm of the rockshaft respectively and adapted to extend in a direction substantially normal to the direction of movement of said member with the support raised.

2. In a tractor-trailer combination, a retractible support, a longitudinally movable member for actuating said support, a rockshaft having a pair of crank arms, a motion transmitting link connecting one of said arms with said member and a second link connected at one end with the support and pivotally joined at its opposite end with the other of said arms for folding cooperation therewith.

3. In a tractor-trailer combination, a retractible trailer support, an actuating member therefor, a rockshaft in longitudinally spaced relation with said support and having a pair of lever arms and linkage connecting said arms to the support and member respectively, said lever arms and linkage being constructed and arranged that initial support movement from retracted position is slow, intermediate movement fast and final movement slow in proportion to the rate of member movement.

4. In a tractor-trailer combination, a swinging prop adapted to be lowered to support the trailer, a longitudinally shiftable reach element for actuating the prop, a rockshaft longitudinally spaced from the axis of the swinging prop, a pair of angularly spaced lever arms connected to said reach element and carried by the rockshaft and prop respectively and constructed that in operation of lowering the prop, the final arcuate movement of the lever arm connected to the reach is in a direction substantially parallel to the direction of movement of the reach element and the final arcuate movement of the other lever arm is in a direction substantially normal to the direction of final arcuate movement of the swinging prop.

5. In a tractor-trailer combination, a longitudinally movable reach adapted to actuate retractible landing gear, a rockshaft operably connected with the landing gear, a lever arm carried by the rockshaft for swinging movement therewith in a vertical direction between vertically spaced upper and lower limits and a link pivotally joined at opposite ends to the reach and lever arm and arranged to extend in a direction substantially normal to the direction of movement of the reach when the lever arm is at its lower limit.

6. In a tractor-trailer combination, a trailer frame, a swinging support pivotally mounted on the frame, a rockshaft pivotally mounted on the frame in longitudinally spaced relation with the axis of the support, a pair of lever arms carried by the rockshaft, a pitman journalled at opposite ends to one of said lever arms and the support for transmitting movement of the rockshaft to swing said support, a longitudinally movable reach mounted in the frame and a connecting link between said reach and the other of said lever arms.

7. Automatic operating mechanism for forcibly raising and lowering landing gear, including in combination with retractible landing gear, of a longitudinally movable reach operably connected to said landing gear, a shiftable king pin engaging fork connected to said reach, and locating means for said fork for the straight line movement thereof including a pin and slot connection between the trailer and the tail of the fork, and sliding abutments on the fork and trailer to guide the movement of the fork.

8. Automatic operating mechanism for forcibly raising and lowering landing gear, including in combination with retractible landing gear, of a longitudinally movable reach operably connected to said landing gear, a shiftable king pin engaging fork connected to said reach, and locating means for said fork for the straight line movement thereof including a pin and slot connection between the trailer and the tail of the fork, and sliding abutments on the fork and trailer to guide the movement of the fork, and means releasably engageable with the fork to hold it against movement in king pin coupling position.

9. In a tractor-trailer combination, a fifth wheel and a movable king pin coupler arranged in superposed relation, said fifth wheel having a king pin receiving and guiding slot, a king pin receiving fork at the inner end of the coupler for the movement of the coupler with the king pin in said slot, a transversely movable pivot for the outer end of the coupler, means on the fifth wheel to guide the forked end of the coupler in a path parallel with the direction of said slot, and traction transmitting member engageable with the coupler to hold the same in king pin coupled relation.

10. In a tractor-trailer combination, a trailer fifth wheel having a tractor king pin receiving slot, a swinging coupler having a king pin receiving fork at its inner end and a transversely shiftable pivot connection at its outer end, coupler guide means extending substantially parallel with said slot, and an arcuate bearing shoe carried by the coupler for slidable engagement with said guide means to shift said pivot connection during swinging movement of the coupler and maintain the path of movement of the forked end in vertical alignment with said slot.

11. In a trailer having automatic tractor coupling mechanism, a swinging coupler having a transversely movable pivot connection at one end and a king pin receiving fork at its other end, guide means to shift the coupler at its pivot connection during swinging movement of the coupler and define a straight line path of movement for the forked end, spaced abutments engageable with the coupler to define its opposite limits of movement, a fifth wheel having a king pin guiding slot in vertical alignment with the path of said forked end of the coupler and extended beyond the rearmost limit of the king pin receiving fork, and a releasable traction transmitting member engageable with the coupler to lock it in its rearmost limit.

12. In a trailer having automatic landing gear operating mechanism including, a shiftable coupler operably connected with the landing gear and movable between given limits with the tractor king pin during coupling and uncoupling operations, a hinged load transmitting member engageable with the coupler to lock the same in coupled position, manually operable release mechanism for said hinged member, collapsible over center linkage associated with and adapted upon actuation of the release mechanism to be extended and moved to an overcenter setting position and means associated with said linkage to be projected into the path of the coupler on its coupling stroke for tripping said linkage and automatically restoring the parts.

13. In a tractor trailer coupling mechanism for automatic actuation of retractible landing gear, including a pair of swingable king pin coupler levers operatively connected with the landing gear, king pin receiving formations in the free ends of the levers arranged in overlapping relation, guide means engageable with the levers to impart straight line direction to said free ends in their movement with the king pin between coupled and uncoupled positions, and pin and slot fulcrums for said levers to accommodate the straight line movement.

CARL J. BOCK.

CERTIFICATE OF CORRECTION.

Patent No. 2,179,708.　　　　　　　　　　　　　　　　November 14, 1939.

CARL J. BOCK.

It is hereby certified that error appears in the printed specification of the above numbered patent requiring correction as follows: Page 4, first column, line 20, claim 4, strike out the words "carried by the rockshaft and" and insert the same after "arms" in line 19, same claim; same page, second column, line 14, claim 9, before "traction" insert a releasable; and that the said Letters Patent should be read with this correction therein that the same may conform to the record of the case in the Patent Office.

Signed and sealed this 30th day of January, A. D. 1940.

Henry Van Arsdale,
(Seal)　　　　　　　　　　　　　　　Acting Commissioner of Patents.